United States Patent [19]

Freedland

[11] Patent Number: 5,372,274
[45] Date of Patent: Dec. 13, 1994

[54] CONTAINER FOR THE STORAGE AND SERVING OF FOOD PRODUCTS

[76] Inventor: Darryle Freedland, 20110 NE 23rd Ct., North Miami Beach, Fla. 33180

[21] Appl. No.: 979,324

[22] Filed: Nov. 20, 1992

[51] Int. Cl.⁵ .......................................... B65D 25/00
[52] U.S. Cl. ................................ 220/571; 220/575; 220/427; 220/DIG. 6
[58] Field of Search .......... 220/574, 575, 571, DIG. 6, 220/771, 427

[56] References Cited

U.S. PATENT DOCUMENTS

| | | |
|---|---|---|
| 267,921 | 11/1882 | Parker . |
| 1,393,325 | 10/1921 | Mitrovich . |
| 1,706,436 | 3/1929 | Bright . |
| 1,754,594 | 4/1930 | Bens . |
| 1,853,132 | 4/1932 | Love . |
| 2,191,811 | 2/1940 | Trampier, Sr. ............... 220/575 |
| 2,610,472 | 9/1952 | Maxwell . |
| 2,732,696 | 1/1956 | Baker . |
| 2,763,134 | 9/1956 | McDonald . |
| 2,810,276 | 10/1957 | Murray . |
| 3,009,599 | 11/1961 | Schier et al. ................ 220/574 |
| 3,118,560 | 1/1964 | Cornelius . |
| 3,130,288 | 4/1964 | Monaco et al. . |
| 3,241,706 | 3/1966 | Monaco et al. . |
| 3,383,880 | 5/1968 | Peters . |
| 3,429,141 | 2/1969 | Halseth . |
| 3,605,433 | 9/1971 | Strathaus . |
| 3,670,916 | 6/1972 | Alpert . |
| 3,710,589 | 1/1973 | Brown et al. . |
| 3,989,158 | 11/1976 | Horian ....................... 220/574 |
| 4,005,586 | 2/1977 | Lyons . |
| 4,147,277 | 4/1979 | Bateman et al. ............. 220/575 |
| 4,265,095 | 5/1981 | McConachie . |
| 4,304,106 | 12/1981 | Donnelly . |
| 4,306,424 | 12/1981 | Chavoor . |
| 4,520,633 | 6/1983 | Hoydic . |
| 4,543,798 | 10/1985 | Page . |
| 4,553,352 | 12/1985 | Powell et al. ............... 220/571 |
| 4,775,067 | 12/1988 | Mount ....................... 220/771 |
| 4,852,741 | 8/1989 | Van Benschoten . |
| 5,174,468 | 12/1992 | Holderman ................. 220/571 |
| 5,456,900 | 10/1985 | Lackey . |

Primary Examiner—Joseph Man-Fu Moy
Attorney, Agent, or Firm—Sixbey, Friedman, Leedom & Ferguson

[57] ABSTRACT

A container for the temporary storage and serving of food products such as salads is provided which comprises an outer bowl, and an inner bowl receivable within the outer bowl such that a space is defined between the outer and inner bowls for containing ice or hot packs for cooling or heating the walls of the inner bowl. A drain assembly for selectively draining excess salad dressing or condensed water out of the inner bowl is also provided which is formed in part from a bottom wall portion of the inner bowl and a drain cover plate that is slidably mounted over the wall portion. Both the bottom wall portion of the inner bowl and the drain cover plate include mutually registrable patterns of drain ports which may be slidably moved into alignment when drainage of the inner is desired. The sliding movement between the drain ports on the bottom wall portion of the inner bowl and the drain cover plate advantageously applies shear forces to food particles which may lodge in the drain ports, thereby advantageously dislodging them.

17 Claims, 3 Drawing Sheets

CONTAINER FOR THE STORAGE AND SERVING OF FOOD PRODUCTS

BACKGROUND OF THE INVENTION

This invention generally relates to containers for the temporary storage and serving of food products, and is specifically concerned with a serving container for maintaining a food product either above or below the ambient temperature which has a drain assembly.

Containers for both temporarily storing food products and for maintaining such products at a desired temperature are well known in the prior art. In some of these containers, the side and bottom walls are insulated in order to retard the transfer of heat between the food product and the ambient air, thereby helping to maintain the food product at the desired serving temperature. In other such containers, an active temperature-modifying medium (such as ice or hot water)is provided around the walls of the receptacle that contains the food product in order to continuously cool or heat it. While such prior art serving containers are generally capable of performing their intended function, the applicant has noted that only a relatively few of such containers have any provisions for draining excess or unwanted liquids out of the food receptacle during the temporary storage period. The general lack of any drainage mechanism is particularly disadvantageous in instances where the container is used to temporarily store foods which are best served at cooler-than-ambient temperatures, such as leafy salads. In the case of such salads, an excess collection of liquids can occur at the bottom of the receptacle from two sources. First, where an active cooling medium such as ice is used to cool the walls of the salad-holding receptacle in the container, water from the ambient humidity can condense on the walls of the receptacle and drain down to its bottom. Secondly, where salad dressings are applied to the leafy materials, excess salad dressing can run down to the bottom of the receptacle and mix with the condensed water, thereby creating an undesirable mixture of salad dressing and water that can only detract from the quality and flavor of the salad. Hot dishes, such as pastas, can also result in the collection of excess water or other liquids at the bottom of the receptacle of such containers. While it might be possible to provide a drainage mechanism at the bottom of the inner receptacle to drain out such undesirable liquids, the applicant has further noted that most conventional drain mechanisms would ultimately become clogged and inoperative due to the lodgement of vegetable matter, pasta, or other food particles in the drain holes.

Clearly, what is needed is a container for the storage and serving of food products which is capable of maintaining a food product at a desired heated or cooled state while at the same time affording drainage of excess water or other liquids by means of a drainage mechanism which does not become clogged during the use of the container. Ideally, such a container should also be simple in construction and relatively inexpensive to manufacture. Such a container should further have a structure which facilitates the installation and removal of a heating or cooling medium, and should also be light-weight and readily portable.

SUMMARY OF THE INVENTION

Generally speaking, the invention is a container for the storage and serving of salads and other food products which eliminates all the aforementioned shortcomings associated with the prior art, and fulfills all of the aforementioned desired characteristics. The container of the invention comprises an outer bowl, an inner bowl receivable within the outer bowl in such a manner that a space is defined between the outer and inner bowls for containing a temperature modifying material such as ice or hot packs which cools or heats the walls of the inner bowl, and a drain assembly for selectively draining excess salad dressing, condensed water, or any other unwanted fluid out of the inner bowl. A partition assembly may be included for partitioning the space contained within the inner bowl into separate spaces for storing different foods.

The drain assembly may be formed in part from a bottom wall portion of the inner bowl having at least one, and preferably several drain ports, as well as a drain cover plate slidably and sealingly mounted over the bottom wall portion for selectively opening and closing the drain ports. In the preferred embodiment, the drain cover plate includes a plurality of ports which are registrable with the drain ports present in the bottom wall portion of the inner bowl by a relative sliding action between the drain cover plate and the bottom wall portion of the inner bowl. The sliding action between the mutually registrable drain ports is advantageously capable of dislodging food particles or other matter which may obstruct drainage through the ports during the use of the container.

The drain cover plate is preferably rotatably mounted with respect to the inner bowl, and the drain assembly may further include a drive rod slidably movable in a bore in the outer bowl which is engaged to the periphery of the drain cover plate to rotate the same when it is reciprocally manipulated. For this purpose, both the periphery of the drain cover plate and a side of the rod may include gear teeth which mutually intermesh when the drive rod is slid through its respective bore in the outer bowl.

To catch the fluids which are drained through the drain assembly, a receptacle in the form of a drawer-like sliding receptacle tray may be provided under the drain assembly.

Finally, the insertion and withdrawal of the inner bowl from the outer bowl may be facilitated by the provision of a pair of opposing handles on the outer periphery of the inner bowl. In the preferred embodiment, these handles take the form of recesses which space the outer periphery of the inner bowl from the inner periphery of the outer bowl so that the fingers of the user of the container may easily grasp the outer periphery of the inner bowl without interference from the outer bowl. Such a design also advantageously provides access to the space between the bowl which allows additional ice or other temperature modifying material to be placed between the bowls without lifting the inner bowl out of the outer bowl.

BRIEF DESCRIPTION OF THE SEVERAL FIGURES

DETAILED DESCRIPTION OF THE PREFERRED EMBODIMENT

Figure 1:
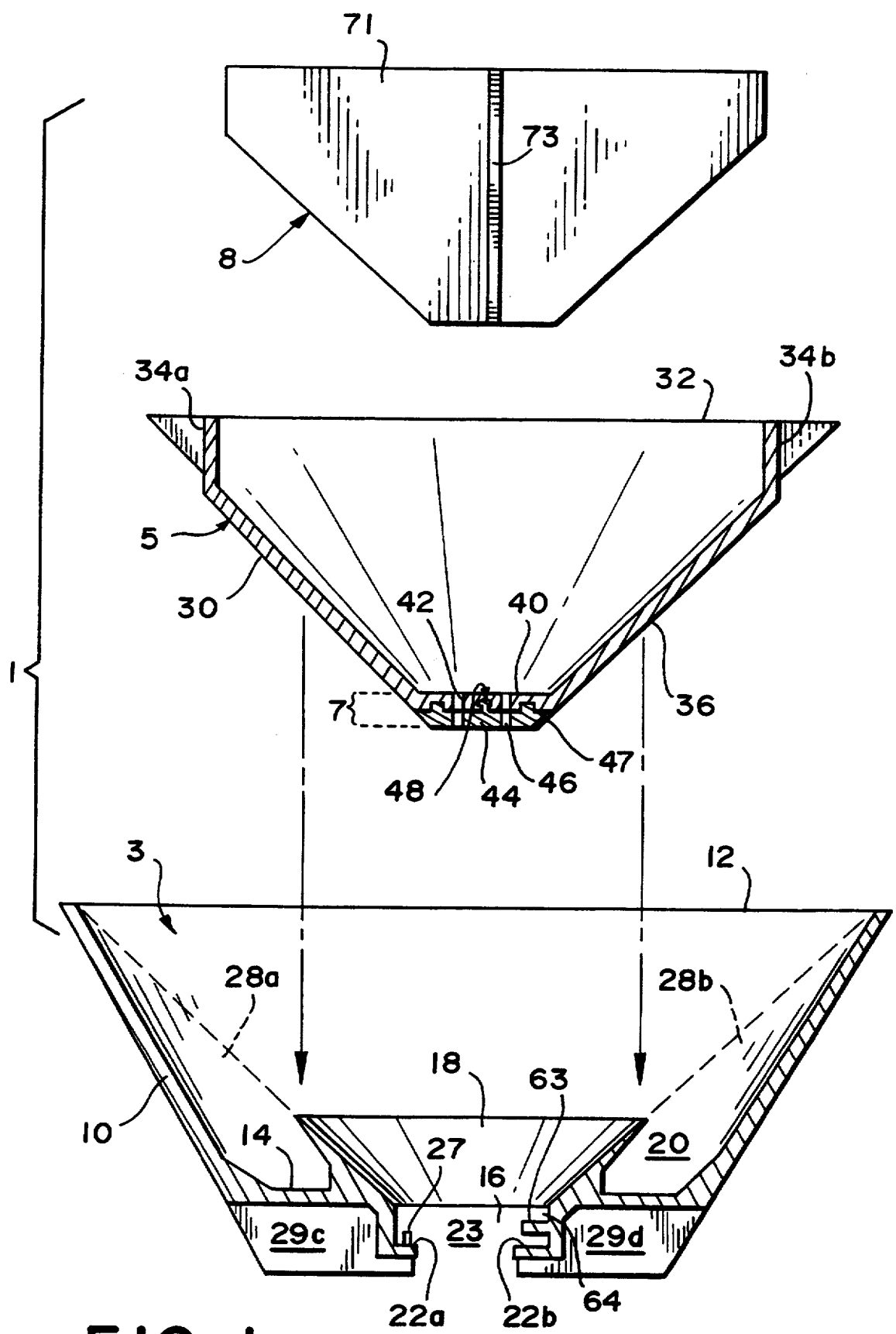
FIG. 1 is a side, cross-sectional view of the storage and serving container of the invention (drawn without the receptacle tray and drive rod) illustrating how the inner bowl is received within the frustro-conical receiving wall of the outer bowl.

With reference now to FIG. 1, wherein like components are designated with like numerals all throughout the several figures, the storage and serving container 1 of the invention generally comprises an outer bowl 3 which receives an inner bowl 5 having a drain assembly 7 located at its bottom portion. A partition assembly 7 is received within the inner bowl 5 for dividing the space within the inner bowl into four separate compartments capable of holding separate foods (i.e., lettus, pasta, chopped fruits, etc.). Both the outer bowl 3 and the inner bowl 5 are preferably molded from a plastic material which maintains its structural rigidity throughout a broad range of temperatures. Examples of such a plastic material include nylon, polyvinyl chloride, Delrin, etc. Alternatively, the inner bowl 5 may be formed from a metal material such as aluminum, while the outer bowl 3 may be formed from molded plastic. While the inner bowl 5 of an alternate construction might be more expensive to fabricate, the aluminum walls of such an inner bowl 5 would provide significantly better heat conduction than plastic walls. In either case, the side walls of the outer bowl 3 should be fabricated thicker than the side walls of the inner bowl 5 so that the outer bowl 3 insulates the ice or other heat-modifying material placed between the bowls 3 and 5 from the ambient atmosphere, while the thinner walls of the inner wall 5 serve to readily conduct heat between this medium and whatever food product is contained within the inner bowl 5 of the container 1.

Figure 2:
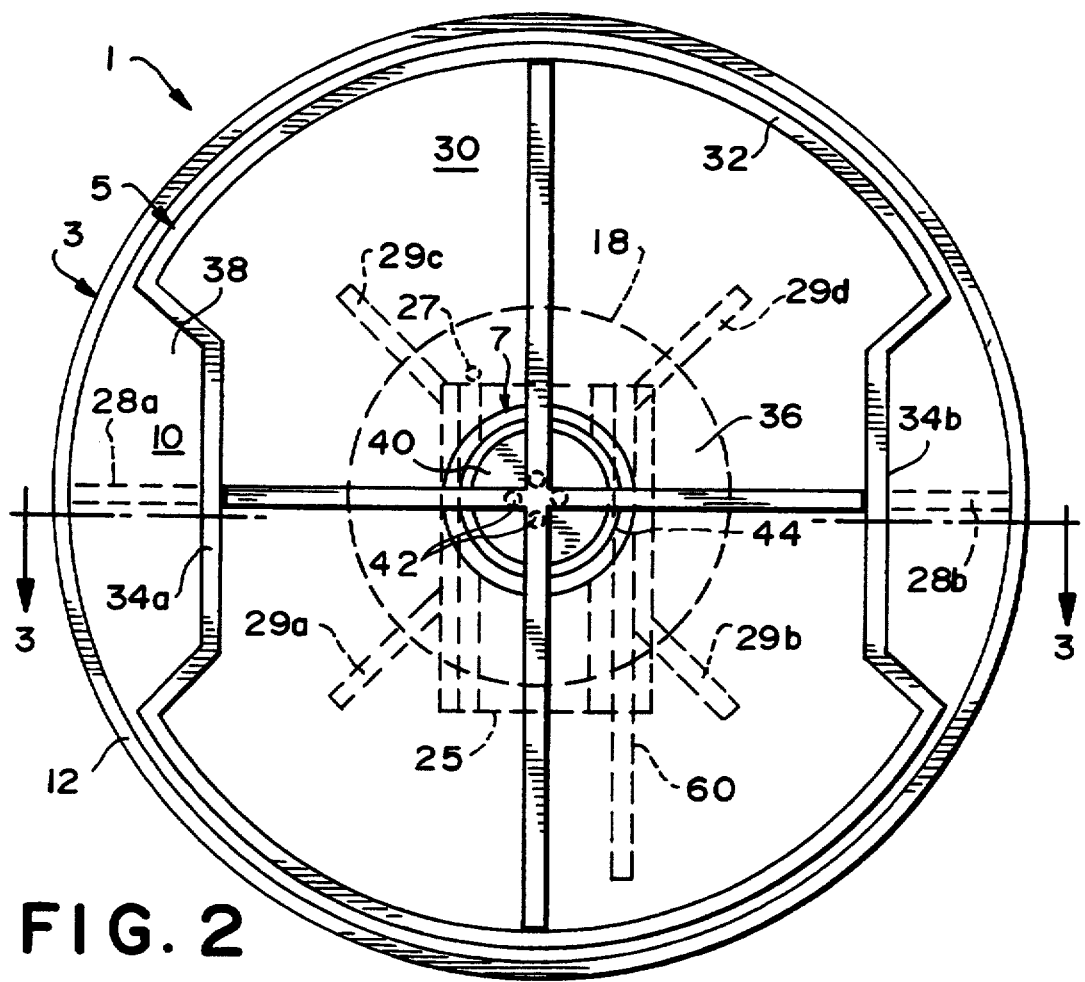
FIG. 2 is a plan view of a storage and serving container of the invention as it appears completely assembled.
Figure 3:
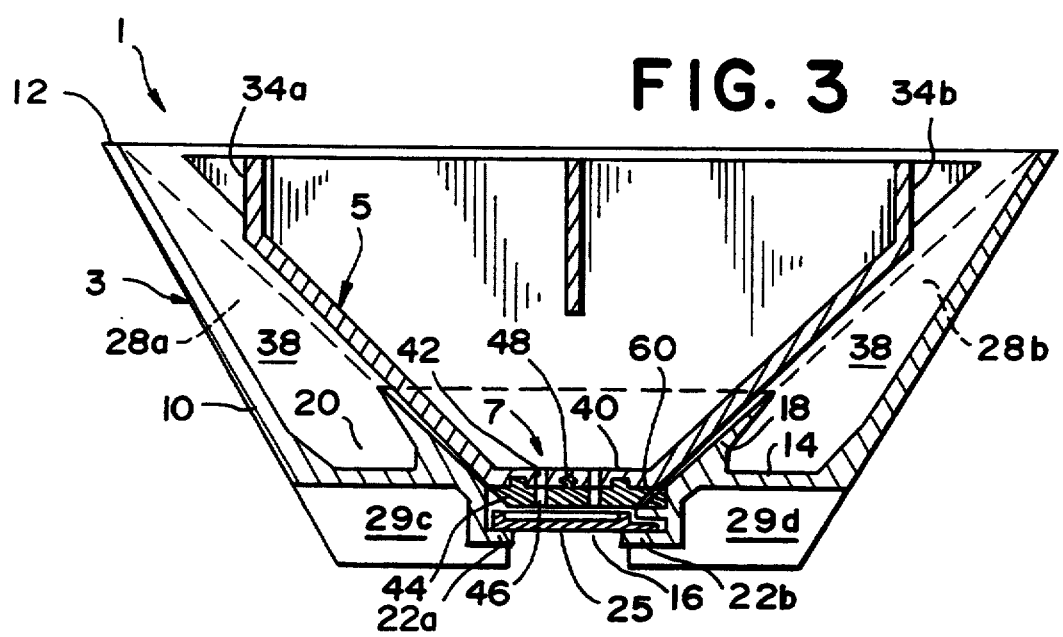
FIG. 3 is a cross-sectional side view of the storage and serving container illustrated in FIG. 2 along the line 3—3.
Figure 4:
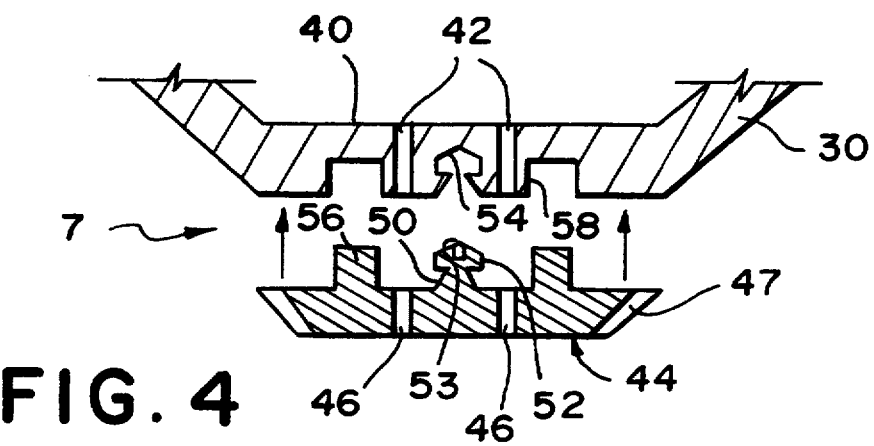
FIG. 4 is an enlarged, cross-sectional side view of the drain assembly of the storage and serving container of the invention, illustrating how the drain plate of the assembly is rotatably connected to the underside of the bottom wall of the inner bowl.
Figure 5:
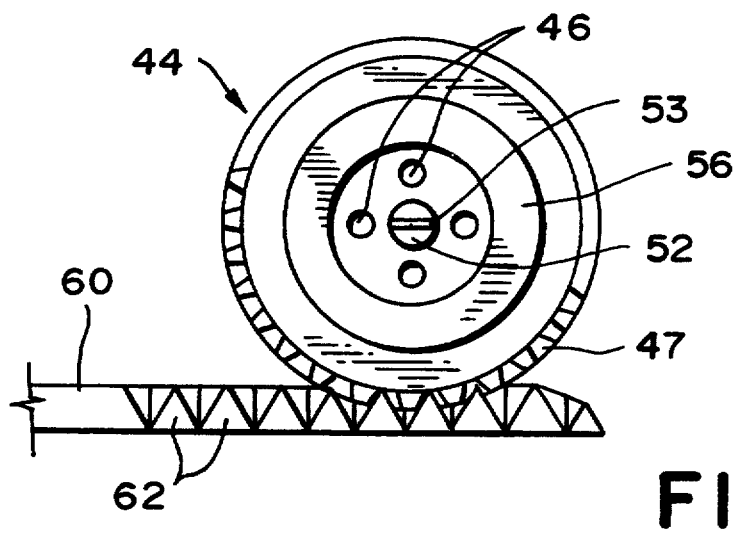
FIG. 5 is a plan view of the drain plate of the invention, illustrating how it is rotated by means of the drive rod of the drain assembly.

With reference now to FIGS. 1, 2, and 3, the outer bowl 3 of the container 1 includes frustro-conical side walls 10 which terminate at their upper ends in a circular edge 12 and at their bottom ends at an annular bottom wall 14. A drain opening 16 is concentrically disposed within the annular bottom wall 14. A frustro-conical receiving wall 18 flares out from the inner edge of the drain opening 16 and terminates at a distance of approximately one-fourth of the total height of the surrounding side walls 10 of the outer bowl 3. The interior surface of the frustro-conical receiving wall 18 is complimentary in shape to the bottom portion of the inner bowl 5 so as to receive and secure it when it is nested within the outer bowl 3 in the position illustrated in FIG. 3. It should be noted that an annular cavity 20 is formed between the outer surface of the frustro-conical receiving wall and the lower inner surface of the side walls 10 of the outer bowl 3. This annular cavity 20 forms the bottom portion of a space 38 defined between the outer and inner bowls 3 and 5 for containing a temperature-modifying material that either cools or heats the contents of the inner bowl 5. When ice is used as the temperature-modifying material, the annular space 20 defined between the walls 18 and 10 advantageously collects any water formed by the melting of the ice and prevents any unwanted drainage of this water from flowing out of the bottom of the container 1. Disposed just beneath the drain opening 16 of the outer bowl 3 are a pair of opposing, right angled receptacle tray brackets 22a and 22b. Together, these brackets 22a and 22b define a tray slot 23 for the receipt of a receptacle tray 25 (shown in plan in FIG. 6). The tray brackets 22a and 22b in combination with the receptacle tray 25 provide a drawer-like structure by which the liquids drained from the drain assembly 7 can be captured and conveniently disposed of. To prevent the receptacle tray 25 from being pushed too far into the tray slot 23, a tray stop 27 is provided in the position shown. The bottom of the outer bowl 3, four orthogonally disposed, rail-shaped feet 29a through d are provided for supporting the container 1 on a flat surface. Finally, partitioning ribs 28a, b, (shown in phantom) may be integrally molded on the inner wall of the outer bowl 3 in order to divide the space 38 for containing the temperature modifying material into two portions, one of which could contain, for example, ice, while the other of which could contain hot packs. In use, the partitioning assembly 8 is aligned with the ribs 28a,b, so that separate compartments in the inner bowl 5 defined by the assembly 8 may be exposed to different temperature modifying materials. This feature in turn allows the serving container 1 to simultaneously warm and cool different foods.

The inner bowl 5 likewise includes frustro-conical side walls 30. As is most clearly evident from FIG. 3A, the side walls 30 of the inner bowl 5 flair out at a flatter angle than the side walls 10 of the outer bowl 3 so that the upper edge 32 of the inner bowl 5 is closely adjacent to the upper edge 12 of the outer bowl at all points in its circumference except at the opposing handle recesses 34a,b, as is best seen in FIG. 2. Such dimensioning creates a tapered, annular space 38 which insulatively encloses whatever heat-modifying material might be placed between the two bowls 3 and 5 except in 0the limited areas above the handle recesses 34. While the handle recesses 34 do allow some exposure to the heat-modifying material disposed in the recess 38 to the ambient atmosphere, they also advantageously provide an access way between the two bowls 3 and 5 which allows more of the temperature-modifying material (such as ice) to be poured between the bowls without the need for lifting the inner bowl 5 out of the outer bowl 3. Of course, the handle recesses 34 also allow the fingers of the user of the container 1 to conveniently gasp the inner bowl 5 when it is desired to lift inner bowl 5 out of the outer bowl 3.

With reference now to FIGS. 2, 3, 4, and 5, the drain assembly 7 of the container 1 is formed in part from the circular bottom wall 40 of the inner bowl 5, which includes a plurality of drain ports 42 as shown. Such ports 42 allow any unwanted liquids which may collect within the inner bowl 5 to drain out through its bottom. To regulate this drainage, a drain cover plate 44 is rotatably connected onto the under side of the circular bottom wall 40 of the inner bowl 5. This drain cover plate 44 likewise includes a plurality of drain ports 46 which are registrable with the drain ports 42 of the bottom wall 40 by rotating the drain cover plate 44 relative to the bottom wall 40. Around the periphery of the drain cover plate 44 are a plurality of beveled gear teeth 44 for a purpose which will become evident shortly.

Disposed in the center of the drain cover plate 44 is the previously referred-to rotatable connection 48. The connection 48 comprises an integrally-formed plastic stud 50 having a tapered head 42 which includes a slot 53 that affords some resiliency to the plastic forming the head 52. Concentrically disposed on the underside of the circular bottom wall 40 of the inner bowl 5 is a tapered opening 54 which is generally complementary in shape to the tapered head 52 of the stud 50. The complementary shape of the tapered opening 54 and the resiliency of the head 52 afforded by slot 53 allows the tapered head 52 to be "snap fitted" into the opening 54.

To minimize unwanted play between the drain cover plate 44 and the bottom wall 40 of the inner bowl 5, a guide annulus 56 is provided on the top surface of the cover plate 54 which slidably fits into a guide recess 58 provided on the bottom surface of the bottom wall 40 of the inner bowl 5. A drive rod 60 is provided so that the user of the storage and serving container 1 can conveniently and remotely rotate the drain cover plate 44 relative to the bottom wall 40 of the inner bowl 5. This drive rod 60 includes beveled gear teeth 62 which are complementary in shape to the beveled gear teeth 47 disposed around the periphery of the drain cover plate 44. In operation, the drive rod 60 is slidably insertable in an elongated recess 64 defined between the upper surface of guide flange 63 of the outer bowl 3, and the periphery of the drain cover plate 44. The sliding action between the drain cover plate 44 and the bottom surface of the bottom wail 40 of the inner bowl 5 not only allows the drain ports 42 at the bottom of the inner bowl 5 to be selectively opened and closed by aligning and misaligning the complementary set of drain ports 46 of the cover plate 44 with these ports; it further provides a shearing action which advantageously operates to break up and dislodge any food particles which might become received within the drain ports 42. Thus the rotation of the drain cover plate 44 serves to open, close, and clear the drain ports 42.

Figure 6:
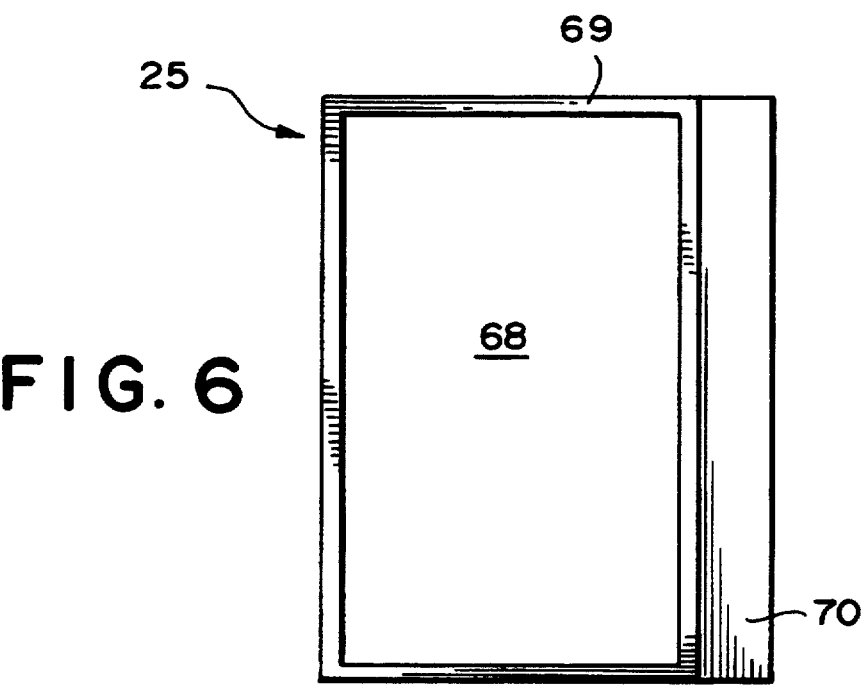
FIG. 6 is a plan view of the receptacle tray of the storage and serving container of the invention which is removably mounted beneath the drain assembly at the bottom of the outer bowl.

With reference now to FIG. 6, the receptacle tray 25 includes a rectangular bottom wall 68 which is bordered by a relatively low side wall 69 completely around its perimeter. A handling flange 70 projects off of the right hand side of the receptacle tray 25 to both provide a more secure sliding and engagement between the receptacle tray 25 and the tray brackets 22a,b at the bottom of the outer bowl 3, as well as an additional grasping surface for the user of the storage and serving container 1. The provision of such a receptacle tray 25 allows the user of the container 1 to drain out any excess liquids which might accumulate at the bottom of the inner bowl 5 into 00the drawer-like tray 25 and then to remove, empty, and reinsert the receptacle tray 25 so that it may receive more such liquids. Alternatively, the receptacle tray 25 may be conveniently removed from the bottom of the outer bowl 3, and the entire container 1 may be place over a sink and selectively drained by manipulation of the drive rod 60.

Finally, with reference again to FIGS. 1, 2 and 3, the partitioning assembly 8 includes a pair of plastic partitioning plates 71 and 73 which are interlocked together by means of interfitting slots 75 (of which only one is shown) in "egg crate" fashion. Guides in the form of integrally-molded ridges (not shown) may be provided on the inner surface of the inner bowl 5 to maintain the partitioning assembly 8 in position.

Although this invention has been described with reference to the single preferred embodiment illustrated in FIGS. 1 through 6, many variations and modifications of this invention will become evident to the person of ordinary skill in the kitchen appliance arts, and all such refinements and modifications are intended to be encompassed within the scope of this invention, which is only limited by the scope of the claims appended hereto.

I claim:

1. A container for the temporary storage and serving of food products, comprising:
   an outer bowl means;
   an inner bowl means having walls for holding a food product, said walls of said inner bowl means being substantially received within and covered by said outer bowl means such that a space is defined between said outer bowl means and the walls of said inner bowl means for containing a material that modifies the temperature of a food product held in the inner bowl means, and
   a drain assembly for draining a fluid material out of said inner bowl means including a bottom wall portion of said bowl means having at least one port, and a means for selectively opening and closing said port including a drain cover plate slidably and sealingly mounted to said inner bowl means under said bottom wall portion having said drain port.

2. A container for the temporary storage and serving of food products according to claim 1, further comprising a receptacle detachably mounted to said container under said selective opening and closing means for receiving fluids drained through said drain port.

3. A container for the temporary storage and serving of food products according to claim 1, wherein said drain cover plate includes at least one drain port that is registrable with the drain port of said bottom wall portion when said drain cover plate is slidably moved, and said relative slidable movement between said drain ports dislodges obstructing material in said drain ports by means of a shearing action.

4. A container for the temporary storage and serving of food products according to claim 3, wherein said bottom wall portion includes a plurality of drain ports, and said drain cover plate includes a plurality of drain ports registrable with the drain ports of said bottom wall portion when said drain cover is slidably moved.

5. A container for the temporary storage and serving of food products according to claim 4, Wherein said drain cover plate is rotatably mounted on said inner bowl means, and said drain assembly includes means for remotely moving said drain cover plate and such that said drain ports of said bottom wall portion and said drain cover plate are moved into and out of registration.

6. A container for the temporary storage and serving of food products according to claim 5, wherein said remote moving means includes an elongated member slidably mounted in said container and engaged to said drain cover plate such that said drain cover plate is moved when said elongated member is slidably moved.

7. A container for the temporary storage and serving of food products according to claim 6, wherein said drain cover plate and said elongated member are engaged by mutually interlocking gear teeth.

8. A container for the temporary storage and serving of food products according to claim 1, wherein said inner bowl means includes a pair of opposing recesses on an outer periphery to facilitate the manual insertion and removal of said inner bowl means with respect to said outer bowl means.

9. A container for the temporary storage and holding of food products, comprising:
an outer bowl means;
an inner bowl means having side walls that are substantially received within and covered by said outer bowl means such that a space is defined between said outer and inner bowl means for containing a material that modifies the temperature of the inner bowl means, wherein said outer bowl means includes means on a bottom wall portion thereof for engagingly receiving and securing a bottom portion of said inner bowl means when said side walls of said inner bowl means are received within said outer bowl means, and
a drain assembly for selectively draining a fluid material out of said inner bowl having a least, one drain port on said bottom portion of said inner wall, and means for selectively opening and closing said port including a drain cover plate slidably and sealingly mounted to said inner bowl means on said bottom wall portion having said drain port.

10. A container for the temporary storage and holding of food products according to claim 9, wherein said inner bowl means has an outer periphery, and a handle means including two opposing recesses in said outer periphery.

11. A container for the temporary storage and holding of food products according to claim 9, wherein said engaging and securing means includes a flange having an outer wall that is spaced away from an inner wall of said outer bowl means to define a recess for receiving a temperature modifying material and an inner wall that is complementary in shape to said bottom portion of said inner bowl means.

12. A container for the temporary storage and holding of food products according to claim 9, further comprising a receptacle detachably mounted to said container under said selective opening and closing means of said drain assembly for receiving fluids drained through said drain port.

13. A container for the temporary storage and holding of food products according to claim 11, wherein said drain cover plate includes at least one drain port that is registrable with the drain port of said bottom wall portion when said drain cover plate is slidably moved, and said relative slidable movement between said drain ports dislodges obstructing material in said drain ports by means of a shearing action.

14. A container for the temporary storage and holding of food products according to claim 13, wherein said bottom wall portion includes a plurality of drain ports, and said drain cover plate includes a plurality of drain ports registrable with the drain ports of said bottom wall portion when said drain cover is slidably moved.

15. A container for the temporary storage and serving of food products, comprising:
an outer bowl means;
an inner bowl means receivable within said outer bowl means such that a space is defined between said outer and inner bowl means for containing a material that modifies the temperature of the inner bowl means;
a drain assembly for selectively draining a fluid out of said inner bowl means, including a bottom wall portion of said inner bowl means having a first drain port, and a drain cover plate having a second drain port slidably and sealingly mounted to said inner bowl means under said bottom wall portion and such that said first and second drain ports are moved into and out of registration when said drain cover plate is slidably moved, and such that said relative sliding movement dislodges obstructing material in said first and second drain ports;
a receptacle slidably and detachably mounted to said outer bowl means under the drain assembly for receiving fluids drainer through said drain port, and
at least one handle means on a periphery of said inner bowl means for facilitating the manual insertion and withdrawal of said inner bowl means with respect to said outer bowl means.

16. A container for the temporary storage and serving of food products according to claim 1, wherein said outer bowl means includes means for engagingly receiving a bottom portion of said inner bowl means when said inner bowl means is inserted into said outer bowl means.

17. A container for the temporary storage and holding of food products according to claim 16, wherein said receiving means includes a flange having an outer wall that is spaced away from an inner wall of said outer bowl means, and an inner wall that is complementary in shape to said bottom portion of said inner bowl means.

* * * * *